United States Patent
Simon et al.

(10) Patent No.: US 11,686,255 B2
(45) Date of Patent: Jun. 27, 2023

(54) METHOD FOR MANUFACTURING A MECHANICAL REDUCER FOR AN AIRCRAFT TURBOMACHINE

(71) Applicant: SAFRAN TRANSMISSION SYSTEMS, Colombes (FR)

(72) Inventors: Adrien Louis Simon, Moissy-Cramayel (FR); Dhafer Ghribi, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/933,894

(22) Filed: Sep. 21, 2022

(65) Prior Publication Data
US 2023/0102913 A1 Mar. 30, 2023

(30) Foreign Application Priority Data
Sep. 28, 2021 (FR) ...................................... 21 10204

(51) Int. Cl.
*F02C 7/36* (2006.01)
*F16H 57/00* (2012.01)

(52) U.S. Cl.
CPC .......... *F02C 7/36* (2013.01); *F05D 2220/323* (2013.01); *F05D 2260/40311* (2013.01); *F16H 2057/0056* (2013.01)

(58) Field of Classification Search
CPC ................. F02C 7/36; F05D 2220/323; F05D 2260/40311; F16H 2057/0056; B64C 11/46
See application file for complete search history.

(56) References Cited

U.S. PATENT DOCUMENTS

| | | | |
|---|---|---|---|
| 5,864,950 A | 2/1999 | Harata et al. | |
| 2016/0084370 A1* | 3/2016 | van Lieshout | F16H 57/12 74/409 |
| 2017/0074354 A1* | 3/2017 | Stocco | F16H 1/28 |
| 2021/0229796 A1* | 7/2021 | Mitrovic | B64C 11/46 |

FOREIGN PATENT DOCUMENTS

| CN | 102720585 A | 10/2012 |
|---|---|---|
| EP | 3 376 072 A1 | 9/2018 |

OTHER PUBLICATIONS

French Preliminary Search Report and Written Opinion dated May 30, 2022 in French Application 21 10204 filed on Sep. 28, 2021 (with English Translation of Categories of Cited Documents), 9 pages.

* cited by examiner

*Primary Examiner* — Lee A Holly
(74) *Attorney, Agent, or Firm* — Oblon, McClelland, Maier & Neustadt, L.L.P.

(57) ABSTRACT

A method for manufacturing a mechanical reducer for an aircraft turbomachine including a central pinion, an outer crown, N planet pinions, where N≥3, each planet pinion including a first stage meshing with the central pinion, and a second stage meshing with the outer crown, the method including the assembly marking, wherein N teeth of the central pinion are marked, and N pairs of teeth of the first stage of each planet pinion are marked, the N planet pinions each being marked identically, and the assembly of the mechanical reducer, so that the teeth of the pairs of marked teeth of the first stage of each planet pinion are disposed on either side of a marked tooth of the central pinion.

11 Claims, 5 Drawing Sheets

METHOD FOR MANUFACTURING A MECHANICAL REDUCER FOR AN AIRCRAFT TURBOMACHINE

TECHNICAL FIELD

The present disclosure relates to the field of mechanical reducers for aircraft turbomachines, such as epicyclic gear reducers, among others. The present disclosure relates in particular to a method for manufacturing such a mechanical reducer.

PRIOR ART

Mechanical reducers are commonly used in mechanics, in particular in the field of aeronautics. Their role is to modify the speed and torque ratio between an input axis and an output axis of a mechanical system.

The new generations of multi-flow turbomachines, in particular those with a high bypass ratio, include a mechanical reducer to drive the shaft of a fan or a propeller. Usually, the reducer allows to transform the speed of rotation called fast speed of rotation of the shaft of a power turbine into a slower speed of rotation for the shaft driving the fan.

Such a reducer conventionally comprises a central pinion, called "sun pinion" (or "sun gear"), an outer crown (or "outer ring"), and pinions, called "planet pinions" (or "planetary gears"), which are meshed between the sun pinion and the outer crown. The planet pinions are held by a frame called the planet carrier. The sun pinion, the outer crown and the planet carrier are planetary components, since their axes of revolution coincide with the longitudinal axis of the turbomachine. On the other hand, the planet pinions each have an axis of revolution different from the axis of revolution of the turbomachine, and distributed at regular intervals over the same operating diameter around the axis of the planetary wheels. These axes of the planet pinions are parallel to the longitudinal axis of the turbomachine.

There are several mechanical reducer architectures. The known mechanical reducers, used in turbofan engines, are of the planetary or epicyclic type. In other applications, there are also architectures called differential architectures. These different types of mechanical reducers differ as follows:

On a planetary reducer, the planet carrier is fixed and the outer crown constitutes the output shaft of the device, which rotates in the direction opposite to the sun pinion.

On an epicyclic reducer, the outer crown is fixed and the planet carrier constitutes the output shaft of the device, which rotates in the same direction as the sun pinion.

On a differential reducer, no element is fixed in rotation. The outer crown rotates in the direction opposite to the sun pinion and the planet carrier.

Moreover, the reducers can comprise one or more meshing stages. This meshing can be ensured in different ways, for example by contact, by friction or else by magnetic fields. Furthermore, there are several types of contact meshing, in particular with straight, helical or chevron toothing.

The alignment of the toothing of the various pinions constituting the multi-stage coaxial mechanical reducers is an essential aspect in the design, manufacture and assembly of mechanical reducers in aircraft engines. Indeed, in the event of misalignment, a situation in which only one of the planet pinions meshes can occur. In this situation, it therefore becomes the only power path, and takes over all the load. This may involve more cumbersome architectures in design or failures in operation.

Solutions such as the counting of the teeth and the axial adjustment by wedges, during the mounting of the mechanical reducer, exist, but their effectiveness is limited. Furthermore, the use of wedges is only valid if at least one of the toothings is helical.

There is therefore a need for a method for manufacturing a mechanical reducer that allows to overcome at least in part the aforementioned disadvantages.

PRESENTATION OF THE INVENTION

The present disclosure relates to a method for manufacturing a mechanical reducer for an aircraft turbomachine comprising a central pinion and an outer crown coaxial with each other around a main axis of rotation, and N planet pinions, where $N \geq 3$, each being movable about a secondary axis of rotation parallel to the main axis of rotation and each comprising a first stage meshing with the central pinion, and a second stage with a diameter smaller than the diameter of the first stage meshing with the outer crown, the method comprising:

the assembly marking, in which N teeth of the central pinion and/or of the second stage of each planet pinion are marked, and N pairs of teeth of the first stage of each planet pinion and/or of the outer crown are marked, the N planet pinions each being marked identically, the assembly of the mechanical reducer, so that the teeth of the pairs of marked teeth of the first stage of each planet pinion are disposed on either side of a marked tooth of the central pinion and/or so that the teeth of the pairs of marked teeth of the outer crown are disposed on either side of a marked tooth of the second stage of each planet pinion.

In the present disclosure, the terms "radial", "axial" and their derivatives are understood relative to the main and secondary axes of rotation. Thus, a radial direction corresponds to a direction perpendicular to the main axis of rotation or to the secondary axis of rotation. Furthermore, an axial face of a pinion corresponds to a face according to a view parallel to the main axis of rotation or to the secondary axis of rotation, and comprised in a plane perpendicular to these axes.

The secondary axis of rotation of each planet pinion is parallel to the main axis of rotation, being offset radially with respect to the latter. Thus, the secondary axes of rotation of the planet pinions are disposed radially outside the central pinion, being parallel to the main axis and gravitating therearound.

In the present disclosure, the central pinion and/or the second stage of each planet pinion comprise as many marked teeth as the mechanical reducer comprises planet pinions. Thus, when the mechanical reducer comprises three planet pinions, the assembly marking step comprises for example the marking of three teeth of the central pinion, in particular an axial face of these teeth. The marking of a tooth can take all types of forms, allowing a user, disposed facing the axial face of the central pinion comprising the marked teeth, to locate said marked teeth.

The teeth are preferably marked at regular intervals. It is understood by "marked at regular intervals" that along its circumference, the central pinion or the second stage of the planet pinions have a substantially identical number of unmarked teeth between two marked teeth. In other words, when three teeth of the central pinion, for example, are marked during assembly marking, the marked teeth are disposed at angles substantially equal to 120° along the circumference of the central pinion, it being understood that said pinion does not necessarily have a number of teeth that is a multiple of three.

It is further understood that a pair of marked teeth corresponds to a configuration in which two successive teeth, in the circumferential direction of the planet pinion, are marked. Moreover, when the mechanical reducer comprises three planet pinions, the first stage of each of the three planet gears also comprises three pairs of marked teeth. Thus, when assembling the mechanical reducer, the planet pinions can be disposed around the central pinion, so that the marked teeth of the pairs of marked teeth of the first stage of each planet pinion are disposed on either side of a marked tooth of the central pinion. In other words, the planet pinions are disposed so that the teeth of the first stage of each of them mesh with the central pinion, and so that each of the marked teeth of the central pinion is disposed between two marked teeth of a planet pinion. It will be noted that the pairs of marked teeth can also be formed on the central pinion so as to be disposed on either side of a marked tooth of the first stage of the planet pinion.

It will also be noted that depending on the configuration of the mechanical reducer, the assembly marking can be carried out on the central pinion and the first stage of each planet pinion only, or on the outer crown and the second stage of each planet pinion only. Regardless of the configuration, the assembly marking can also be carried out on each of these wheels (central pinion, outer crown, first and second stage of the pinions). Furthermore, the planet pinions are all marked the same way. Thus, each of the N planet pinions comprises the same number of teeth and/or pairs of marked teeth, disposed in the same way.

This method thus allows, through the assembly marking step carried out before mounting, to precisely identify the angular position of the various pinions relative to each other, and thus to ensure the mountability of the various elements composing the mechanical reducer. Indeed, in a non-optimal positioning, the fact of shifting a tooth of one of the planet pinions in relation to the central pinion for example, could generate overloads on certain teeth during the operation of the reducer. The precise mounting allowed by this method allows to maintain sufficient clearance between the various teeth interlocking with each other during assembly so that, during operation of the mechanical reducer, the loads are distributed uniformly on the teeth of the various pinions.

In certain embodiments, the method comprises, before the assembly marking, a preliminary step of orientation marking in which a tooth of the first and second stages of each planet pinion is marked, so that the orientation of the marked teeth of the first and second stage relative to each other is identical for each planet pinion.

The fact of marking a tooth of the first stage and of the second stage of each planet pinion during the orientation marking step, so that the orientation of these marked teeth with respect to each other is identical for each planet pinion, allows to ensure, by measuring said orientation on each pinion, that the planet pinions have been manufactured in such a way as to be identical to each other. In particular, it is possible to manufacture and mark a first planet pinion, and to manufacture other planet pinions identical to the first planet pinion, the markings of the latter serving as a reference.

This method thus allows, on the one hand by the orientation marking allowing to ensure that all the planet pinions are identical, and then by the assembly marking step carried out before mounting, to identify precisely the angular position of the various pinions relative to each other. In particular, the prior orientation marking allows to further improve this precision.

In certain embodiments, the orientation marking is made on a first face of each planet pinion, and the assembly marking is made on a second face, opposite the first face, of each planet pinion.

The first and the second face are axial faces of the planet pinions opposite to each other. In other words, each planet pinion comprises pinions on each of its opposite faces. The fact of carrying out the orientation marking on a first face, then the assembly marking on a second face of the pinion, allows to distinguish the assembly markings without any risk of confusion with the manufacturing markings. This improves the reliability of the method.

In certain embodiments, the orientation marking comprises, for each planet pinion, the manufacture of the teeth of the first stage, the marking of a tooth of the first manufactured stage, the manufacture of the teeth of the second stage then, the marking of a tooth of the second stage.

In certain embodiments, an angle measured on each planet pinion between a straight line passing through the secondary axis of rotation of the planet pinions and the marked tooth of the first stage, and a straight line passing through the secondary axis of rotation of the planet pinions and the marked tooth of the second stage, is identical for each of said planet pinions.

In other words, the teeth of the second stage of each planet pinion are oriented at a predetermined angle with respect to the teeth of the first stage of each planet pinion. This angle being the same for each planet pinion, and being identified and measured by the marked teeth on the first and on the second stage of each planet pinion, the manufacturing markings made on each of the planet pinions thus constitute a reliable and measurable reference, ensuring that all the planet pinions are identical to each other, in other words, that the teeth of their respective first and second stage are oriented in the same way. This facilitates the subsequent assembly step and improves the mounting accuracy.

In certain embodiments, the orientation marking comprises, for each planet pinion, the manufacture of the teeth of the second stage, the marking of a tooth of the second manufactured stage, the manufacture of the teeth of the first stage then, the marking of a tooth of the first stage.

In other words, it is possible to manufacture and mark one of the first stage or the second stage of each pinion first, then the other of the first stage or the second stage second.

In certain embodiments, during the orientation marking, at least two teeth of the first stage or of the second stage of each planet pinion are marked. It is thus possible to measure the orientation of the second stage with respect to the first stage, by at least two angles formed between the marking of the second stage (or of the first stage) and the at least two markings of the first stage (or of the second stage), and thus further improve the accuracy of the measurements.

In certain embodiments, the outer crown comprises two separate portions, the assembly marking initially comprising the marking of N teeth of the central pinion, preferably at regular intervals, around the main axis of rotation, and N pairs of teeth of the first stage of each planet pinion, and the assembly of the mechanical reducer initially comprising disposing the N planet pinions around the central pinion, such that the teeth of the pairs of marked teeth of the first stage of each planet pinion are disposed on either side of a marked tooth of the central pinion.

In this configuration, the outer crown comprises a first portion intended to mesh with the teeth of the second stages on the first face of the planet pinions, and a second portion distinct from the first portion, intended to mesh with the teeth of the second stages on the second face of the planet pinions. In this case, during the assembly step, the planet pinions are initially disposed around the central pinion which is preferably made in one-piece, then the first and the second portion of the outer crown are disposed around the second stages of the planet pinions. Consequently, it is necessary, during the preliminary marking step, to initially mark the N teeth of the central pinion, and the N pairs of teeth of the first stage of each planet pinion. Indeed, the planet pinions are positioned in relation to the central pinion which is made in one-piece in order to improve the precision of mounting, contrary to a positioning in relation to the two distinct portions of the outer crown, which would increase the risk of inaccuracies in the assembly. Optionally, it is also possible to also mark N teeth of the second stages and N pairs of teeth of the outer crown. This additional marking allows an additional verification, at the end of the assembly, allowing to ensure that the mounting has been correctly carried out.

In some embodiments, the central pinion comprises two separate portions, the assembly marking initially comprising the marking of N teeth of the second stage of each planet pinion, preferably at regular intervals, around the secondary axis of rotation, and of N pairs of teeth of the outer crown, and the assembly of the mechanical reducer initially comprising disposing the N planet pinions inside the outer crown, such that the teeth of the pairs of marked teeth of the outer crown are disposed on either side of a marked tooth of the second stage of each planet pinion.

In this configuration, the central pinion comprises a first portion intended to mesh with the teeth of the first stages on the first face of the planet pinions, and a second portion distinct from the first portion, intended to mesh with the teeth of the first stages on the second face of the planet pinions. In this case, during the assembly step, the planet pinions are initially placed inside the outer crown which is preferably made in one-piece, then the first and the second portion of the central pinion are disposed between the first stages of the planet pinions. Consequently, it is necessary, during the preliminary marking step, to initially mark the N teeth of the second stage of each planet pinion, and the N pairs of teeth of the outer crown. Indeed, the planet pinions are positioned in relation to the outer crown which is made in one-piece in order to improve the precision of mounting, contrary to a positioning in relation to the two distinct portions of the central pinion, which would increase the risk of inaccuracies in the assembly. It is also possible to mark, in addition, N teeth of the central pinion and N pairs of teeth of the first stages. This allows an additional verification, at the end of the assembly, allowing to ensure that the mounting has been correctly carried out.

In certain embodiments, the assembly marking comprises the marking of at least one first tooth of the second stage of each planet pinion, then at least one second tooth and at least one third tooth, with substantially regular intervals, starting from the first tooth of the second stage of the planet pinion.

The first marked tooth of the second stage thus serves as a reference from which a second tooth, a third tooth or more are also marked. The teeth and pairs of teeth of the other pinions and the crown can be marked in the same way. It is thus possible to easily identify the position of the teeth during assembly, and consequently to improve the alignment of the pinions relative to each other.

In certain embodiments, the assembly marking comprises the marking of at least a first marking pattern, at least a second marking pattern different from the first marking pattern, and at least a third marking pattern different from the first and from the second marking pattern, the teeth being marked in such a way that, during assembly of the mechanical reducer, the teeth of a pair of marked teeth have a marking pattern identical to the marking pattern of the marked tooth disposed between said marked teeth of the pair of marked teeth.

In other words, at the time of assembly, the pattern of a marked tooth of the central pinion, for example, is identical to the pattern of the two teeth of the pair of marked teeth of the first stage of the planet pinion, between which they are located. Preferably, the number of existing different patterns is equal to the number of planet pinions that the reducer has. It is thus possible to determine, during mounting of the mechanical reducer, the exact position, radially and in the circumferential direction, in which each pinion must be, in order to ensure the alignment of the various parts relative to each other at the end of mounting and during operation of the reducer.

In certain embodiments, the marking of a tooth is carried out by the formation of a punch on an axial face of the tooth.

A mechanical punch produced by machining by means of a ball milling cutter, and allowing to locally mark the surface of the tooth, on the axial face thereof, can for example be used. This allows, in a simple way, to perform the marking, and therefore a visible mark on the face of the tooth.

In certain embodiments, the first marking pattern comprises one punch, the second marking pattern comprises two punches, and the third marking pattern comprises three punches.

It is thus possible to easily produce marking patterns which are different from each other.

In certain embodiments, the mechanical reducer comprises three planet pinions, three teeth of the central pinion and/or of the second stage of each planet pinion each being marked at substantially 120° from one another.

Alternatively, the mechanical reducer may comprise four planet pinions, four teeth of the central pinion and/or of the second stage of each planet pinion each being marked at substantially 90° from each other around the main axis of rotation (or around the secondary axis of rotation), or else five planet pinions, five teeth of the central pinion and/or of the second stage of each planet pinion each being marked at substantially 72° from each other around the main axis of rotation (or around the secondary axis of rotation).

In certain embodiments, the mechanical reducer is an epicyclic gear reducer.

Alternatively, the mechanical reducer may be a planetary reducer or a differential reducer. It will also be noted that the invention applies to mechanical reducers having straight, helical or chevron toothing, and comprising one-piece planet carriers or of the "cage+cage carrier" type. The invention is also compatible with all types of planet bearing, which may comprise a rolling element or a hydrodynamic bearing.

The present disclosure also relates to a mechanical reducer for an aircraft turbomachine, comprising a central pinion and an outer crown coaxial with each other around a main axis of rotation, and N planet pinions, where 3, each movable about a secondary axis of rotation parallel to the main axis of rotation, each planet pinion comprising a first stage meshing with the central pinion, and a second stage with a diameter smaller than the diameter of the first stage meshing with the outer crown, in which N teeth of the central pinion and/or of the second stage of each planet pinion, disposed at regular intervals, comprise a marking, and N pair of teeth of the first stage of each planet pinion and/or of the outer crown comprises a marking, the teeth of the pair of marked teeth of the first stage of each planet pinion being disposed on either side of a marked tooth of the central pinion.

Thus, in the event of an operation requiring the disassembly, then the reassembly of the mechanical reducer, the markings present on the teeth allow to adjust the orientation of the various pinions relative to each other, and thus to improve their alignment.

BRIEF DESCRIPTION OF THE DRAWINGS

The invention and its advantages will be better understood upon reading the detailed description given below of various embodiments of the invention given by way of non-limiting examples. This description refers to the pages of appended figures, on which.

DESCRIPTION OF EMBODIMENTS

Figure 1:
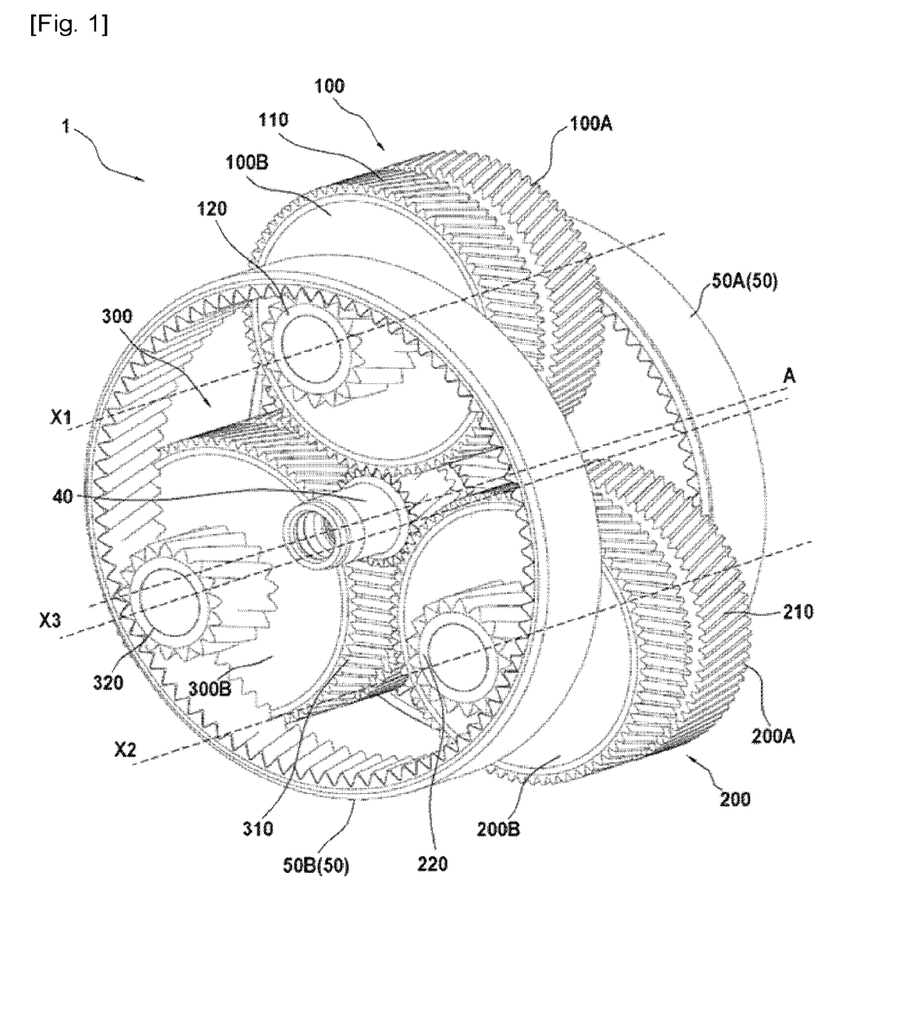
FIG. 1 shows a perspective view of a mechanical reducer after manufacture according to the method of the present disclosure.

FIG. 1 shows a perspective view of a mechanical reducer 1 with a double-stage planetary gear obtained by a manufacturing method in accordance with the present disclosure. The mechanical reducer 1 is configured to be disposed in a turbomachine, for example a bypass turbomachine, and to drive the shaft of a fan or propeller of the turbomachine (not shown). In particular, the mechanical reducer 1 allows to transform the speed of rotation of the shaft of a power turbine into a slower speed of rotation for the shaft driving the fan. Consequently, according to the present disclosure, the main axis of rotation A, around which the central pinion 40 and the outer crown 50 extend, corresponds to the axis of rotation of the fan, when the reducer is disposed in a turbomachine.

In the rest of the disclosure, the terms "radial", "axial" and their derivatives are understood with respect to the main axis of rotation A and to the secondary axes of rotation X1, X2, X3 described in the following part of the disclosure.

The mechanical reducer 1 comprises a central pinion 40, or sun pinion, comprising a plurality of teeth on its radially outer face and in two rows, and an outer crown 50 comprising a plurality of teeth on its radially inner face. The central pinion 40 and the outer crown 50 are coaxial and axisymmetric around the main axis of rotation A. It will be noted that in the non-limiting example presented with reference to FIG. 1, the mechanical reducer 1 is a two-stage reducer, wherein the crown 50 comprises two portions 50A, 50B.

In this example, the mechanical reducer 1 further comprises three planet pinions 100, 200, 300, each being disposed between the central pinion 40 and the outer crown 50, being engaged with the latter. More specifically, each planet pinion comprises two symmetrical axial faces each meshing with one of the portions 50A, 50B of the outer crown 50, and with a row of teeth of the central pinion 40.

Moreover, each axial face of each planet pinion comprises two toothed stages. More specifically, on each of their axial faces, the first planet pinion 100 comprises a first stage 110 and a second stage 120, the second planet pinion 200 comprises a first stage 210 and a second stage 220, and the third planet pinion 300 comprises a first stage 310 and a second stage 320. For each of these planet pinions, the first stage has a diameter greater than that of the second stage. The first stage 110, 210, 310 of each axial face meshes with a row of teeth of the central pinion 40, and the second stage 120, 220, 320 of each axial face meshes with the teeth of one of the portions 50A, 50B of the outer crown 50.

It will also be noted that the axial faces of each planet pinion 100, 200, 300 are respectively called the manufacturing face and the assembly face within the context of the method according to the invention. In particular, the first planet pinion 100 comprises a manufacturing face 100A and an assembly face 100B, the second planet pinion 200 comprises a manufacturing face 200A and an assembly face 200B, and the third planet pinion 300 comprises a manufacturing face (not visible in FIG. 1) and an assembly face 300B.

Furthermore, the first planet pinion 100 is axisymmetric and movable about a first secondary axis of rotation X1. Similarly, the second planet pinion 200 is axisymmetric and movable about a second secondary axis of rotation X2, and the third planet pinion 300 is axisymmetric and movable about a third secondary axis of rotation X3. Each of the first, second, and third secondary axes of rotation X1, X2, X3 is parallel to the main axis of rotation A, and gravitates around the latter during operation of the mechanical reducer 1. The secondary axes of rotation X1, X2, X3 are also equidistant from the main axis of rotation A. The mechanical reducer 1 can also comprise a planet carrier (not shown) serving as a frame holding the planet pinions in their respective position.

Figure 2:
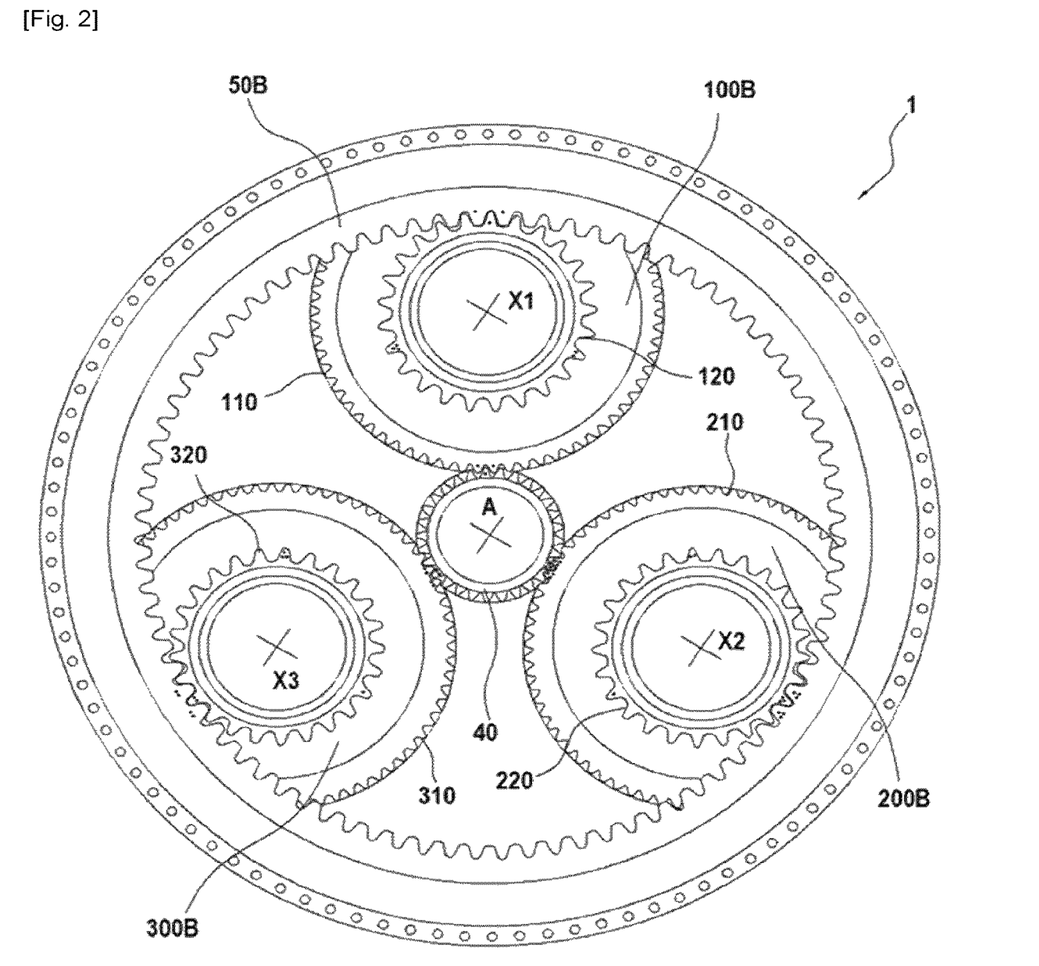
FIG. 2 shows a front view of the mechanical reducer of FIG. 1.

FIG. 2 shows the mechanical reducer 1 of FIG. 1 in a view parallel to the main axis of rotation A of the mechanical reducer 1, on the side of the assembly faces 100B, 200B, 300B of the planet pinions. It will be understood that FIG. 2 shows the mechanical reducer 1 at the end of the assembly of the various elements composing this reducer, in their initial position, that is to say before any rotation of these elements, the markings described in the following part of the disclosure being visible.

A method for manufacturing the mechanical reducer 1 shown in FIGS. 1 and 2, according to an embodiment of the present disclosure, will be described with reference to FIGS. 3 to 7.

Figure 7:
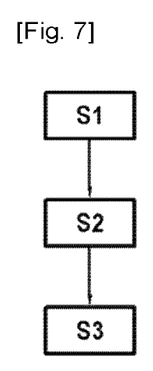
FIG. 7 shows the different steps of a method for manufacturing a mechanical reducer according to the present disclosure.

A first step of the method (step S1) comprises the orientation marking on each planet pinion 100, 200, 300, produced on the manufacturing face of the planet pinions. For the sake of brevity, this step is described only with reference to the first planet pinion 100 illustrated in FIG. 3, in particular to the manufacturing face 100A of the latter, but nevertheless applies to each of the three planet pinions. During this step, after the manufacture of the teeth of the second stage 120, for example, a first tooth 151 is marked on the second stage 120 of the first planet pinion 100. For this purpose, a punch is made on an axial face of a tooth 151 of the second stage 120. Then, the teeth of the first stage 110 are manufactured, and an axial face of a tooth 152 of the first stage 110 is marked, such that a radial axis R passing through the center of the pinion 100, that is to say through the secondary axis of rotation X1, and through the marked tooth 151 of the second stage 120, and an axis R' passing through the center of the pinion 100 and through the marked tooth 152 of the first stage 110, form a predetermined and measurable angle θ.

Figure 3:
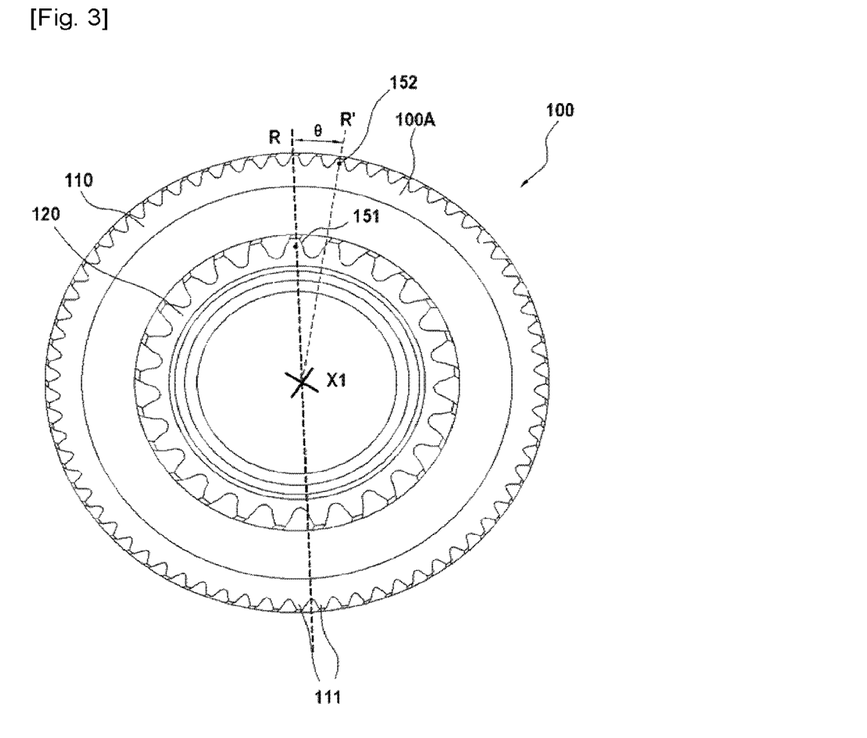
FIG. 3 shows a front view of a planet pinion after an orientation marking step.

The other two planet pinions 200, 300 are then manufactured according to the same process, so that during the manufacture of the first stage, the teeth of the first stage are oriented with respect to the teeth of the second stage already manufactured, in the same way as for the first planet pinion 100. For this purpose, a digital model of the pinions 200, 300 is used to program the machine tool, before manufacturing, so that a tooth of the first stage and a tooth of the second stage form, with respect to each other, the same angle θ as for the first pinion 100. The pinions 200, 300 are thus manufactured, and punches made in the same places as on the first pinion 100 allow to ensure that the angle θ measured on each pinion is identical. The first pinion 100 thus serves as a reference, from which the other pinions are made, so that the three planet pinions 100, 200, 300 are strictly identical.

It will be noted that more teeth can be marked, and more angles can be measured, in order to further improve the precision of manufacture. In addition, it is also possible to manufacture and initially mark the first stage 110, then the second stage 120. It will also be noted that any other measurement method can be used, as long as the teeth are all measured in the same way.

Figure 4:
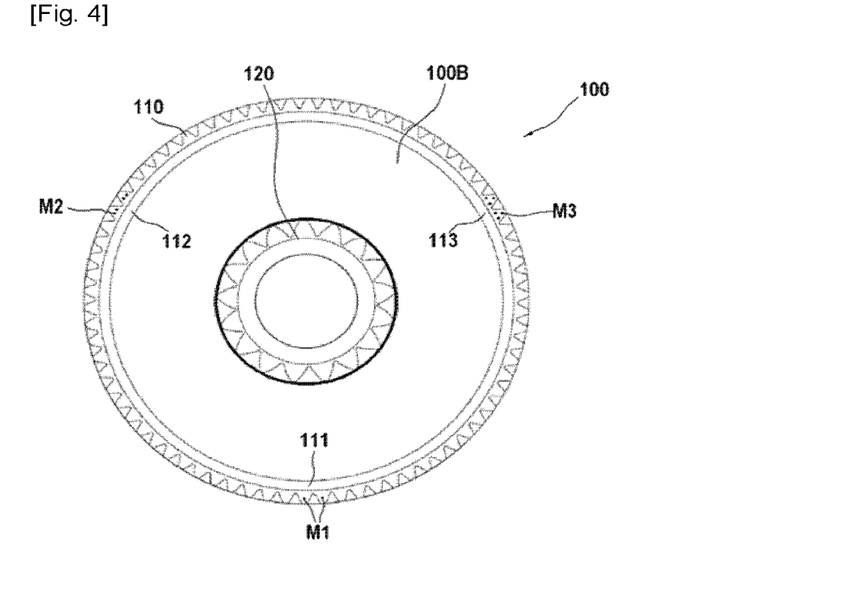
FIG. 4 shows a front view of the opposite face of the planet pinion of FIG. 3, after an assembly marking step.

An assembly marking step is then carried out (step S2).

During this step, a first pair of teeth 111 is marked on the assembly face 100B, opposite the manufacturing face 100A, of the first stage 110 of the planet pinion 100. The first pair of teeth 111 corresponds to two successive marked teeth along the circumference of the first stage 110.

In the same way, a second pair of teeth 112, and a third pair of teeth 113 of the first stage 110 are marked, preferably at regular intervals, from the position of the first pair of teeth 111. More specifically, considering that in this example three pairs of teeth of the first stage are marked, these three pairs of teeth are spaced circumferentially from each other by approximately 120°, taking into account that the total number of teeth is not necessarily a multiple of three. Thus, the same number of unmarked teeth is preferably disposed between each of the pairs of marked teeth 111, 112 and 113. Alternatively, the teeth, or pairs of marked teeth, could not be distributed at regular intervals, as long as their distribution is identical on each pinion.

To make these markings, punches can be made on the axial faces of the teeth, by machining using a ball milling cutter to locally identify the surface of the tooth.

A single punch constitutes a first marking pattern M1, two adjacent punches on the same tooth constitute a second marking pattern M2, and three adjacent punches on the same tooth constitute a third marking pattern M3. These examples are not limiting, other patterns, comprising for example four punches or more, are also possible.

It will thus be noted that, while the teeth of the first pair of teeth 111 are marked according to the first pattern M1, the teeth of the second pair of teeth 112 are marked according to the second pattern M2, and the teeth of the third pair of teeth 123 are marked according to the third pattern M3.

Furthermore, the markings described above made on the first planet pinion 100 are also made, in an identical manner, on the assembly faces 200B, 300B of the second and third planet pinions 200, 300.

Figure 5:
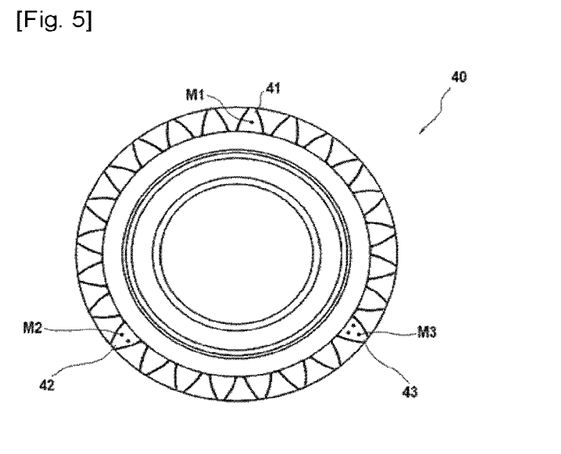
FIG. 5 shows a front view of a central pinion after the assembly marking step.

During step S2, three teeth of the central pinion 40 are also marked. More specifically, an axial face of a first tooth 41 of the central pinion 40 is marked according to the first pattern M1, then an axial face of a second tooth 42 is marked according to the second pattern M2, and finally an axial face of a third tooth 43 is marked according to the third pattern M3. Similarly, each of the teeth 41, 42, 43 are preferably spaced circumferentially at regular intervals, at approximately 120° from each other.

The order in which the different markings made during the assembly marking step S2 is not limiting, these markings being able to be made in a different order. For example, the teeth of the central pinion 40 can be initially marked, then the teeth of the planet pinions.

When the assembly marking step S2, comprising the various markings described above, is completed, the assembly of the various parts is carried out (step S3). This assembly is made from the markings made in the previous step S2. In particular, the assembly is made in such a way that the teeth of pairs of marked teeth 111, 112, 113 of the first stage of the planet pinions 100, 200, 300 are disposed on either side of one of the three marked teeth 41, 42, 43 of the central pinion 40, respecting the correspondence of the marking patterns.

Figure 6:
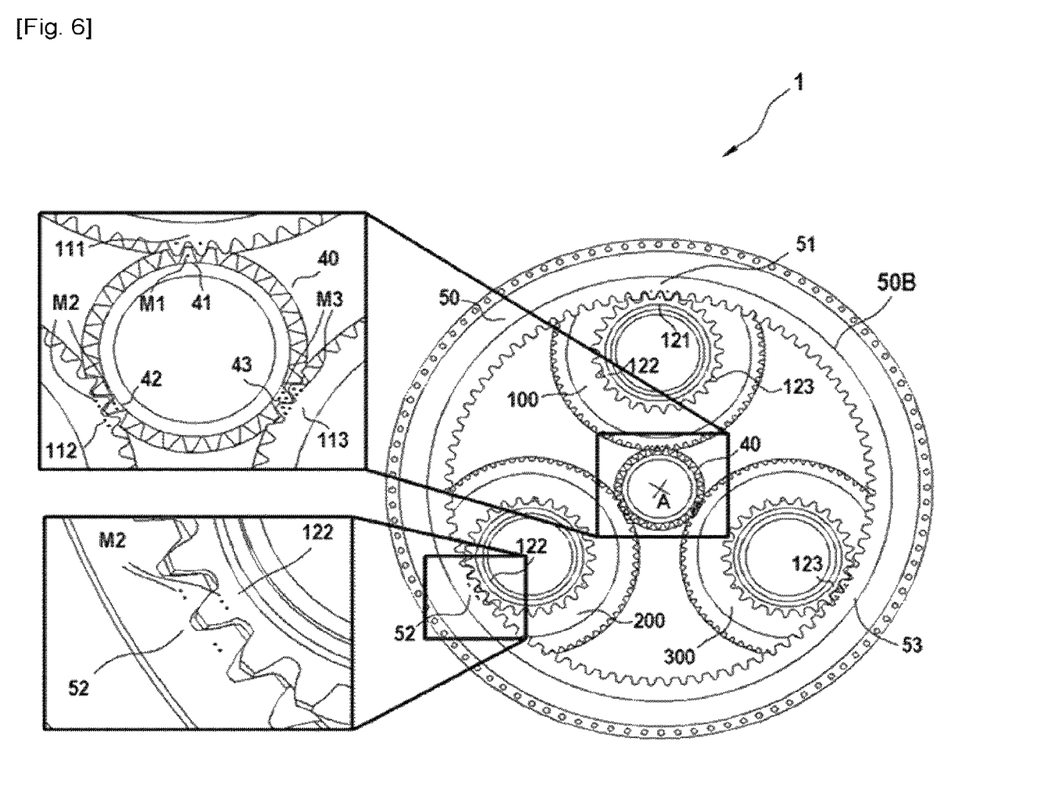
FIG. 6 shows the mechanical reducer of FIG. 2, with a detailed view of the central pinion, and a detailed view of the marked teeth meshing with each other of the outer crown and of a planet pinion.

In other words, the marked teeth of the first pair of teeth 111 of one of the pinions, marked according to the first marking pattern M1, must be disposed on either side of the first marked tooth 41 of the central pinion 40, also marked according to the first pattern M1. Similarly, the marked teeth of a second pair of teeth 112 of another of the pinions, marked according to the second marking pattern M2, must be disposed on either side of the second marked tooth 42 of the central pinion 40, also marked according to the first second marking pattern M2. Finally, the marked teeth of a third pair of teeth 113 of the third pinion, marked according to the third marking pattern M3, must be disposed on either side of the third marked tooth 43 of the central pinion 40, also marked according to the third marking pattern M3. Once the three planet pinions have been thus disposed around the central pinion 40, the two portions 50A, 50B of the outer crown 50 are then disposed around the planet pinions. FIG. 6 represents the mechanical reducer 1 after the assembly step S3.

In the example described above, where the outer crown 50 is in two portions 50A, 50B, the marking of the teeth of the central pinion 40 and the teeth of the first stage 110, 210, 310 of each planet pinion 100, 200, 300 may be sufficient to allow assembly of the various parts in step S3. However, markings can also be made during step S2 on the teeth of the second stage 120, 220, 320 of each planet pinion 100, 200, 300, and on the teeth of the crown 50, in order to improve the reliability of the verification of the positioning of the various pinions. FIGS. 2 and 6 show an example in which the teeth of the outer crown 50 and the second stage of each planet pinion are marked, in addition to the teeth of the central pinion 40 and the first stage of each planet pinion.

Thus, three pairs of teeth of the outer crown 50, in particular of the portion 50B of the outer crown, can be marked. Each of the marked teeth of a first pair of teeth 51 is marked according to the first pattern M1, each of the marked teeth of a second pair of teeth 52 is marked according to the second pattern M2, and each of the marked teeth of a third pair of teeth 53 is marked according to the third pattern M3. Moreover, a first tooth 121 of the second stage of each planet pinion is marked according to the first pattern M1, a second tooth 122 of the second stage of each planet pinion is marked according to the second pattern M2, and a third tooth 123 of the second stage of each planet pinion is marked according to the third pattern M3.

In the same way, the assembly in step S3 is carried out such that the teeth of each pair of marked teeth 51, 52, 53 of the outer crown 50 are disposed on either side of one of the three marked teeth 121, 122, 123 of the second stage of the planet pinions, respecting the correspondence of the marking patterns, according to the principle described in the preceding paragraph.

Preferably, in the present disclosure, when a large-diameter pinion meshes with a smaller-diameter pinion, the larger-diameter pinion comprises the teeth marked in pairs, and the smaller-diameter pinion comprises the teeth marked singly and disposed between the teeth of the pairs of marked teeth of the larger diameter wheel. Thus, the teeth of the outer crown 50 are marked in pairs, while the teeth of the second stage 120 of the planet pinions, with a diameter smaller than the outer crown 50 and meshing therewith, have teeth marked separately, so as to be disposed between two teeth of the pairs of teeth of the outer crown 50. Similarly, the teeth of the first stage 110 of the planet pinions are marked in pairs, while the teeth of the central pinion 40, with a diameter smaller than the first stage 110 and meshing therewith, have teeth marked separately, so as to be disposed between two teeth of the pairs of teeth of the first stage 110.

It will also be noted that the assembly step may comprise the assembly of a planet carrier (not shown).

Although the embodiment described above describes a scenario in which the mechanical reducer 1 comprises three planet pinions, this example is not limiting, and the invention is also applicable to mechanical reducers comprising four, five, or more two-stage planet pinions. In particular, in a mechanical reducer comprising four planet pinions, each element of this mechanical reducer (planet pinion, central pinion and outer crown) will comprise four teeth, or pairs of marked teeth, spaced from each other by 90°. In the same way, in a mechanical reducer comprising five planet pinions, each element of this mechanical reducer (planet pinion, central pinion and outer crown) will comprise five teeth, or pairs of marked teeth, spaced from each other by 72°.

Although the present invention has been described with reference to specific embodiments, it is obvious that modifications and changes can be made to these examples without departing from the general scope of the invention as defined by the claims. In particular, individual features of the different illustrated/mentioned embodiments can be combined in additional embodiments. Accordingly, the description and the drawings should be considered in an illustrative rather than restrictive sense.

It is also obvious that all the features described with reference to a method can be transposed, alone or in combination, to a device, and conversely, all the features described with reference to a device can be transposed, alone or in combination, to a method.

The invention claimed is:

1. A method for manufacturing a mechanical reducer for an aircraft turbomachine comprising a central pinion and an outer crown coaxial with each other around a main axis of rotation, and N planet pinions where N≥3, each being movable about a secondary axis of rotation parallel to the main axis of rotation and each comprising a first stage meshing with the central pinion, and a second stage with a diameter smaller than the diameter of the first stage meshing with the outer crown, the method comprising:
    assembly marking, wherein N teeth of the central pinion and/or of the second stage of each planet pinion are marked, and N pairs of teeth of the first stage of each planet pinion and/or of the outer crown are marked, the N planet pinions each being marked identically,
    assembling the mechanical reducer, so that the teeth of the pairs of marked teeth of the first stage of each planet pinion are disposed on either side of a marked tooth of the central pinion and/or so that the teeth of the pairs of marked teeth of the outer crown are disposed on either side of a marked tooth of the second stage of each planet pinion.

2. The method according to claim 1, comprising, before the assembly marking, a preliminary step of orientation marking wherein a tooth of the first and the second stage of each planet pinion is marked, so that the orientation of the marked teeth of the first and second stage relative to each other is identical for each planet pinion.

3. The method according to claim 2, wherein the orientation marking is made on a first face of each planet pinion, and the assembly marking is made on a second face, opposite the first face, of each planet pinion.

4. The method according to claim 2, wherein the orientation marking comprises, for each planet pinion, the manufacture of the teeth of the first stage, the marking of a tooth of the first manufactured stage, the manufacture of the teeth of the second stage, then the marking of a tooth of the second stage.

5. The method according to claim 4, wherein an angle measured on each planet pinion between a straight line passing through the secondary axis of rotation of the planet pinions and the marked tooth of the first stage, and a straight line passing through the secondary axis of rotation of the planet pinions and the marked tooth of the second stage, is identical for each of said planet pinions.

6. The method according to claim 1, wherein the outer crown comprises two separate portions, the assembly marking initially comprising the marking of N teeth of the central pinion around the main axis of rotation, and N pairs of teeth of the first stage of each planet pinion, and the assembly of the mechanical reducer initially comprising disposing the N planet pinions around the central pinion, such that the teeth of the pairs of marked teeth of the first stage of each planet pinion are disposed on either side of a marked tooth of the central pinion.

7. The method according to claim 1, wherein the central pinion comprises two separate portions, the assembly marking initially comprising the marking of N teeth of the second stage of each planet pinion around the secondary axis of rotation, and of N pairs of teeth of the outer crown, and the assembly of the mechanical reducer initially comprising disposing the N planet pinions inside the outer crown, such that the teeth of the pairs of marked teeth of the outer crown are disposed on either side of a marked tooth of the second stage of each planet pinion.

8. The method according to claim 1, wherein the assembly marking comprises the marking of at least a first marking pattern, at least a second marking pattern different from the first marking pattern, and at least a third marking pattern different from the first and from the second marking pattern, the teeth being marked in such a way that, during assembly of the mechanical reducer, the teeth of a pair of marked teeth have a marking pattern identical to the marking pattern of the marked tooth disposed between said marked teeth of the pair of marked teeth.

9. The method according to claim 8, wherein the marking of a tooth is carried out by the formation of a punch on an axial face of the tooth, the first marking pattern comprising one punch, the second marking pattern comprising two punches, and the third marking pattern comprising three punches.

10. The method according to claim 1, wherein the mechanical reducer comprises three planet pinions, three teeth of the central pinion and/or of the second stage of each planet pinion each being marked at substantially 120° from one another.

11. The method according to claim 1, wherein the mechanical reducer is an epicyclic gear reducer.

\* \* \* \* \*